United States Patent
Zhang et al.

(10) Patent No.: US 7,532,721 B2
(45) Date of Patent: May 12, 2009

(54) IMPLEMENTATION OF A SWITCH-BOX USING A SUBFIELD METHOD

(75) Inventors: Ming Zhang, San Jose, CA (US); Awais Bin Nemat, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 864 days.

(21) Appl. No.: 10/976,533

(22) Filed: Oct. 28, 2004

(65) Prior Publication Data

US 2006/0093136 A1    May 4, 2006

(51) Int. Cl.
*H04L 9/28* (2006.01)

(52) U.S. Cl. ..................................... 380/28
(58) Field of Classification Search ............... None
See application file for complete search history.

(56) References Cited

U.S. PATENT DOCUMENTS 6,367,017 B1   4/2002  Gray ............... 726/9

2004/0184602 A1*  9/2004  Nadehara ............... 380/28

OTHER PUBLICATIONS www.streamingmedia.com, Dee McVicker, "Sure-Fire Tips for Encoding High-Quality, Low-Bandwidth Audio, Part 1," 4 pages total, Apr. 2, 2002, Streaming Media Inc., www.streamingmedia.com/r/printerfriendly.asp?id=8205.

* cited by examiner

*Primary Examiner*—Brandon S Hoffman
(74) *Attorney, Agent, or Firm*—Stolowitz Ford Cowger LLP (57) ABSTRACT

Methods and systems for implementing a switch box (S-box) in a cryptographic application are described. An input to the S-box is converted from a Galois field representation $GF(N^2)$ to a Galois subfield representation $GF(N)^2$. The input is converted using a generating polynomial of the form $x^2+Ax+B$, where A and B are elements in $GF(N)$ and where A has a value other than unity. The multiplicative inverse of the Galois subfield representation $GF(N)^2$ is determined. The multiplicative inverse is converted back to the Galois field representation $GF(N^2)$. An affine transformation of the multiplicative inverse is then performed.

26 Claims, 4 Drawing Sheets

IMPLEMENTATION OF A SWITCH-BOX USING A SUBFIELD METHOD

TECHNICAL FIELD

Embodiments of the present invention pertain to cryptographic techniques.

BACKGROUND ART

There is an increasing demand to protect data transmitted over open networks such as the Internet and wireless communication networks. The Advanced Encryption Standard (AES) provides a scheme for encrypting and decrypting information that is growing in popularity. AES is a symmetric key approach in which both the sender and the receiver use the same key to encrypt and decrypt information.

Hardware implementations of AES provide advantages over software implementations. In software, the key is vulnerable to attack, and software implementations are not fast enough for Internet applications. In hardware, parallel processing and pipelining can be used to increase throughput and reduce latency. Furthermore, hardware implementations are considered more secure because tampering by an outside attacker is more difficult.

A switch box or substitution table (S-box) receives some number of bits as input, and returns some number of bits as output. The AES S-box includes a multiplicative inversion and an affine transformation. The inversion can be implemented using a 256-entry lookup table (LUT).

A Galois field (GF), or finite field, is a mathematical structure that is extensively used in fields such as cryptography. It is well known that a finite field of $q^n$ elements can be represented by polynomials modulo an irreducible polynomial of degree n, the polynomials being defined over GF(q). A field with $2^{mn}$ elements can be represented either by an irreducible polynomial over GF(2) of degree mn, or as a composite field (or subfield) representation by an irreducible polynomial over GF($2^n$) of degree m.

By converting or transforming the basis of the original field to the composite or subfield representation, the inversion in the S-box can be simplified. Specifically, the inversion in GF(256) can be converted to calculations in GF(16)$^2$, using an irreducible generating polynomial of the form $x^2+x+B$, with B in GF(16). The inversion can then be implemented using a relatively small 16-entry LUT, thereby improving performance by increasing throughput and reducing latency through the hardware.

Conventionally, the AES S-box utilizes a large number of gates and dominates the hardware complexity of an AES circuit. As a result, conventional AES circuits have a high area overhead (that is, more area in silicon is required) and higher fabrication costs.

Accordingly, an AES S-box implementation that reduces gate count while maintaining high throughput would be advantageous. Embodiments in accordance with the present invention provide these and other advantages.

SUMMARY OF THE INVENTION

Embodiments of the invention pertain to methods and systems for implementing an S-box in a cryptographic application. In one embodiment, the cryptographic application is compliant with (or substantially compliant with) the Advanced Encryption Standard (AES).

In one embodiment, during encryption, an input to the S-box is converted from a Galois field representation GF(N$^2$) to a Galois subfield representation GF(N)$^2$. In one embodiment, N is 16; that is, a representation in GF(256) is converted to a representation in GF(16)$^2$.

The input is converted using a generating polynomial of the form $x^2+Ax+B$, where A and B are elements in GF(N) and where A has a value other than unity. The multiplicative inverse of the Galois subfield representation GF(N)$^2$ is determined. The multiplicative inverse is converted back to the Galois field representation GF(N$^2$). An affine transformation of the multiplicative inverse is then performed. The process is in essence reversed during decryption.

In one embodiment, values for A and B are selected so that the Galois subfield representation GF(N)$^2$ is isomorphic to the Galois field representation GF(N$^2$). In one such embodiment, A has a value of (0010) and B has a value of (0010). Using these values of A and B, the gate count is reduced relative to conventional S-box implementations in hardware.

In yet another embodiment, the step in which the multiplicative inverse is converted back to the Galois field representation GF(N$^2$) is merged with the step in which the affine transformation is performed. Specifically, the multiplicative inverse is represented as a first matrix. The multiplicative inverse is converted back to the Galois field representation GF(N$^2$) using a second matrix, and the affine transformation uses a third matrix. In the present embodiment, the third matrix is multiplied by the second matrix to produce a fourth matrix that is multiplied by the first matrix. Thus, a matrix multiplication is eliminated.

In summary, embodiments in accordance with the present invention improve the S-box implementation in applications such as AES cryptography. As a result, the gate count in circuits that implement the present invention S-box can be reduced. Accordingly, circuits that implement the present invention S-box will utilize less silicon area and have lower fabrication costs than conventional circuits. Furthermore, a reasonably low propagation delay (latency) is maintained so that a hardware implementation of the present invention S-box implementation can be used for high throughput applications.

These objects and advantages of the present invention as well as others will be recognized by those of ordinary skill in the art after having read the following detailed description.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures and components have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed in computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system or similar electronic computing device (e.g., an intelligent device having computer-like functionality, such as a router or switch). It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "converting" or "determining" or "performing" or "multiplying" or "adding" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention may be implemented as a computer-usable medium that has computer-readable program code embodied therein. The computer system can include, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output device for providing a physical communication link between the computer system and a network, using either a wired or a wireless communication interface.

Figure 1:
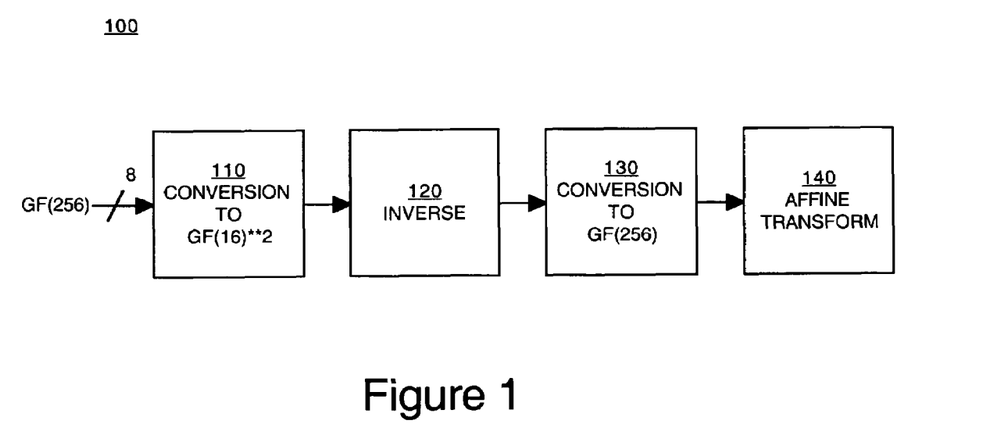
FIG. 1 is a data flow diagram showing steps in an encryption process according to one embodiment of the present invention.

FIG. 1 is a data flow diagram showing steps in an encryption process 100 according to one embodiment of the present invention. Specifically, process 100 provides an overview of an implementation of an S-box that can be used in a cryptographic application, such as but not limited to a cryptographic application according to the Advanced Encryption Standard (AES).

In the example of FIG. 1, a basis transformation is used to simplify implementation of the S-box. In block 110, in the present embodiment, an eight-bit input in GF(256) is converted to a subfield or composite representation in GF(16)$^2$. Thus, instead of calculating the multiplicative inverse in GF(256), the inverse can be calculated in GF(16)$^2$, with multiplication, squaring and addition operations performed in GF(16). Also, instead of performing the inversion in GF(256) using a 256-entry lookup table (LUT), the inversion can be performed in GF(16) using a smaller 16-entry LUT.

In block 120, in the present embodiment, multiplicative inversion of the transformed input is performed in GF(16). All operations except for the inversion can be performed using logic elements (e.g., XOR gates). The inversion is determined using an LUT, as mentioned above.

In block 130, in the present embodiment, a basis transformation back to GF(256) is performed. In block 140, an affine transformation is performed.

Figure 2:
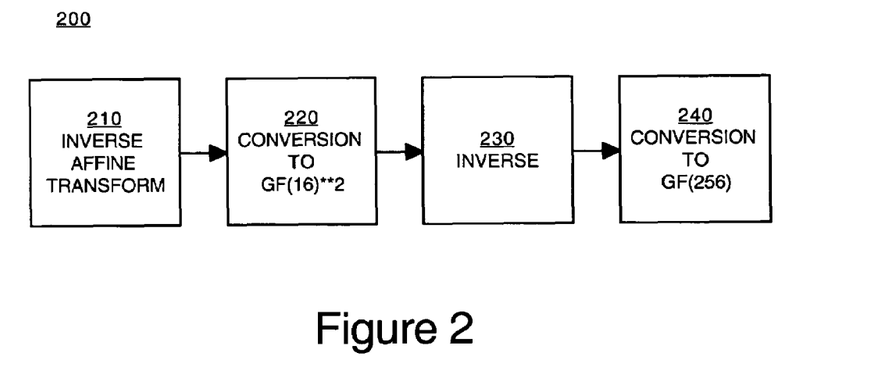
FIG. 2 is a data flow diagram showing steps in an decryption process according to one embodiment of the present invention.

FIG. 2 is a data flow diagram showing steps in a decryption process 200 according to one embodiment of the present invention. Specifically, process 200 provides an overview of an implementation of an inverse S-box that can be used in a cryptographic application, such as but not limited to an AES application.

In block 210, an inverse affine transform is performed. In block 220, in the present embodiment, an input in GF(256) is converted to a subfield representation in GF(16)$^2$.

In block 230, in the present embodiment, multiplicative inversion of the transformed input is performed in GF(16). In block 240, in the present embodiment, a basis transformation back to GF(256) is performed.

Figure 3:
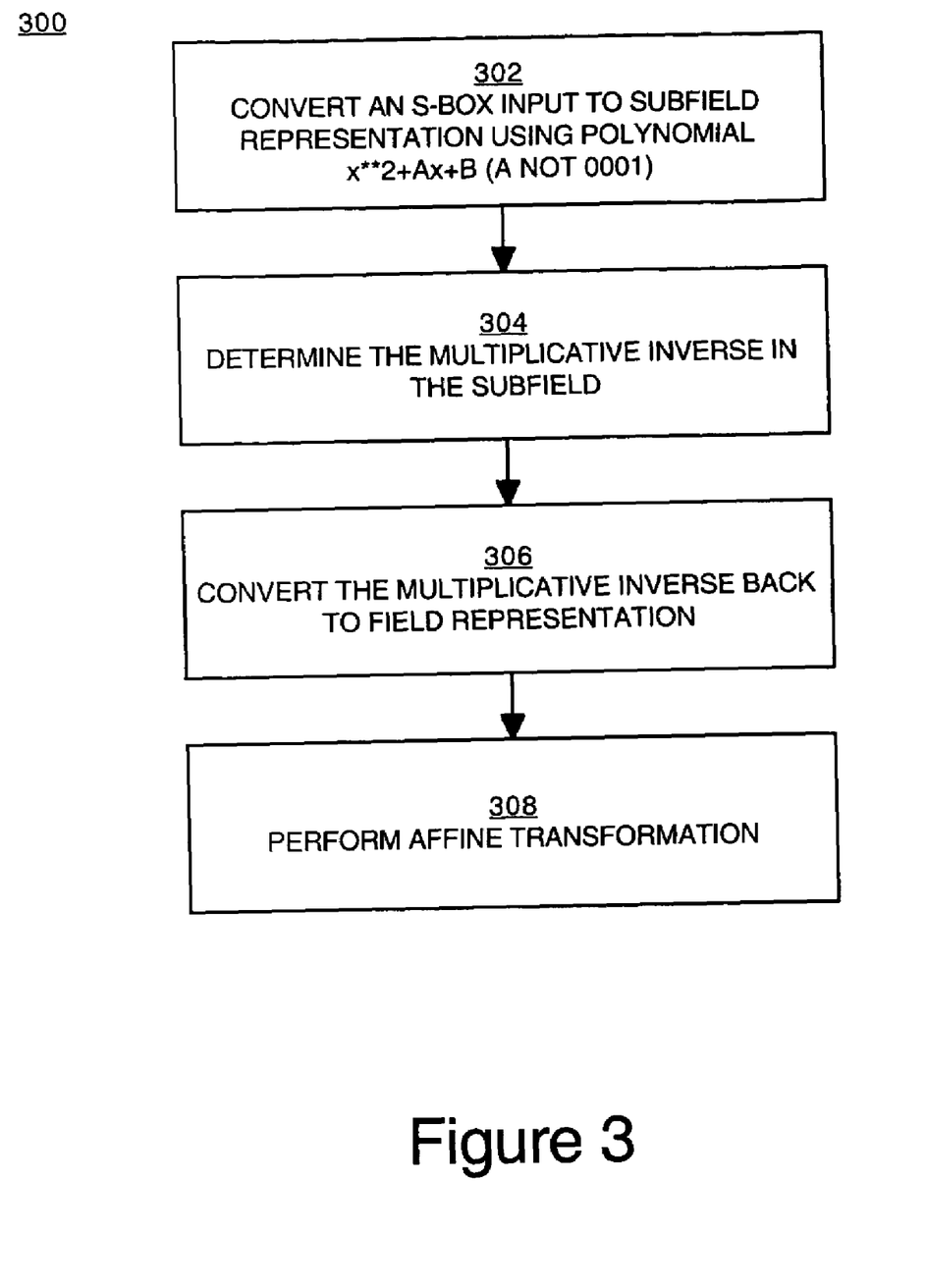
FIG. 3 is a flowchart of a method for implementing an S-box in a cryptographic application according to one embodiment of the present invention.

FIG. 3 is a flowchart 300 of a method for implementing an S-box in a cryptographic application according to one embodiment of the present invention. Although specific steps are disclosed in flowchart 300, such steps are exemplary. That is, embodiments of the present invention are well suited to performing various other (additional) steps or variations of the steps recited in flowchart 300.

In step 302, in one embodiment, an input to the S-box is converted from a GF(256) representation to a subfield or composite representation in GF(16)$^2$ using an irreducible polynomial of the form:

$$x^2+Ax+B, \tag{1}$$

where A and B are constant elements in GF(16) and where A is not the identity element or unity. That is, for an eight-bit input, A is not equal to (0001).

There are more than one fields in GF(16)$^2$ that are isomorphic to a field in GF(256). According to one embodiment of the present invention, for an eight-bit input, a value of (0010) is selected for A and a value of (0010) is selected for B. Using these values of A and B, the polynomial of equation (1) is isomorphic.

More importantly, the above values of A and B reduce logic complexity, facilitating the implementation of the present invention S-box in hardware. The number of gates can be reduced, thereby reducing silicon area. However, a reasonably low propagation delay and a relatively high throughput are maintained.

In step 304, the multiplicative inverse of the transformed input is determined. An element C in $GF(16)^2$ can be expressed as bx+c. If C is eight (8) bits in length, then b and c are each four (4) bits in length.

The multiplicative inverse $C^{-1}=(bx+c)^{-1}$ can then be determined using the following equation:

$$C^{-1}=b(b^2B+bcA+c^2)^{-1}x+(c+bA)(b^2B+bcA+c^2)^{-1}. \quad (2)$$

Note that the term $(b^2B+bcA+c^2)^{-1}$ appears twice in equation (2). The inverse is determined using a number of multiplying, squaring and adding operations that are performed using logic operations in hardware (e.g., using XOR gates), with the inversion performed using an LUT.

In steps 306 and 308, the transformed and inverted value is converted back to its original representation (e.g., GF(256)) and an affine transformation is performed.

Figure 4:
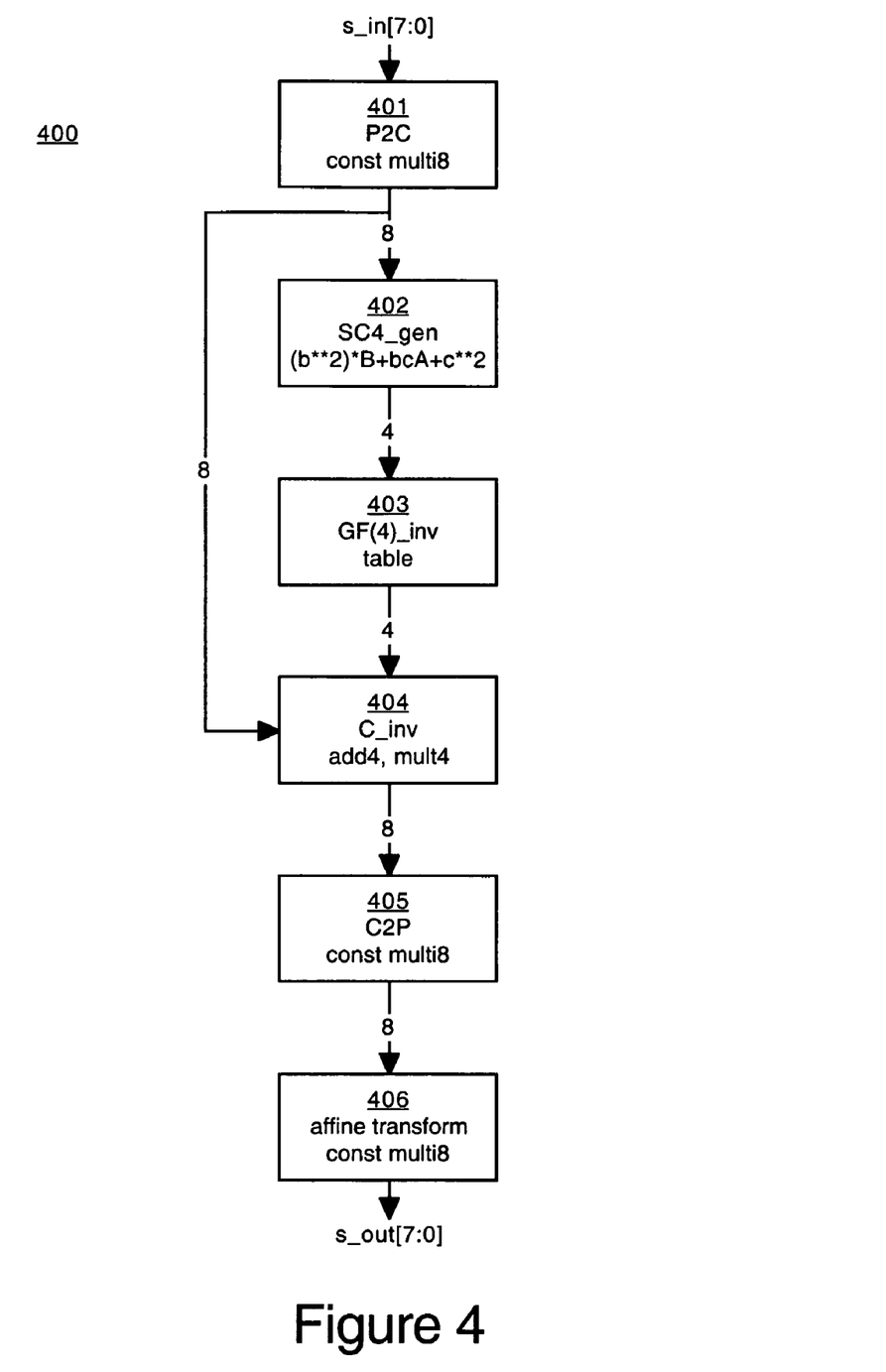
FIG. 4 is a data flow diagram of a method for implementing an S-box in a cryptographic application according to one embodiment of the present invention.

FIG. 4 is a data flow diagram of a method 400 for implementing an S-box in a cryptographic application according to one embodiment of the present invention. In the example of FIG. 4, an 8-bit input "s_in" is received by the S-box at block 401. In the present embodiment, the input s_in is converted from its original representation to a composite representation "s_in_c" using matrix multiplication:

$$s\_in\_c=P2C*s\_in, \quad (3)$$

where P2C is an 8×8 matrix and s_in and s_in_c are column vectors. In one embodiment, the input s_in is converted from GF(256) to $GF(16)^2$.

In blocks 402, 403 and 404, in the present embodiment, the multiplicative inverse of C ($C^{-1}$) is determined. In block 402, the term $(b^2B+bcA+c^2)^{-1}$ of equation (2) is computed using adding, squaring and multiplying operations performed in hardware. In one embodiment, for an 8-bit input, A has a value of (0010) and B has a value of (0010) because, using these values, a circuit that implements the S-box of the present invention uses fewer gates than conventional circuits, but maintains or improves performance.

In block 403, in the present invention, the inverse in GF(16) is found using an LUT. In block 404, further add and multiply operations required by equation (2) are performed in hardware to complete the inversion in GF(16), represented as "C_inv" in FIG. 4.

In block 405, in the present embodiment, the inversion is converted from the composite representation C_inv to its original representation "inv" using matrix multiplication:

$$inv=C2P*C\_inv, \quad (4)$$

where C2P is a constant 8×8 matrix. In one embodiment, C_inv is converted from $GF(16)^2$ to GF(256).

In block 406, in the present embodiment, the affine transformation "AFF" is performed:

$$s\_out=AFF*inv+constant, \quad (5)$$

where AFF is an 8×8 matrix defined by AES, the constant is a column vector, and "s_out" is an 8-bit output of the S-box.

Figure 5:
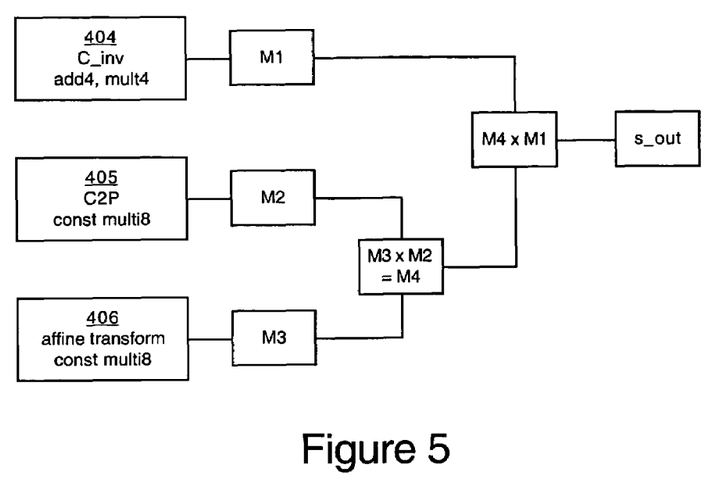
FIG. 5 is a data flow diagram showing the merging of operations in a method for implementing an S-box according to one embodiment of the present invention.

FIG. 5 is a data flow diagram showing the merging of operations in a method for implementing an S-box according to one embodiment of the present invention. FIG. 5 shows a portion of the data flow diagram of FIG. 4.

In the present embodiment, at block 404, the multiplicative inversion of C (C_inv) is generated. At this stage of the S-box, C_inv is a column vector (e.g., a 1×8 matrix), designated "M1" in FIG. 5.

At block 405, the constant matrix C2P (designated "M2" in FIG. 5) is introduced to convert the composite representation back to the original representation. At block 406, the matrix AFF (designated "M3") is introduced for the affine transformation. According to AES, the values of the elements in matrix AFF are established based on the values of A and B that are selected for equations (1) and (2). Thus, the matrix AFF is a constant matrix for a given value pair A and B.

In one embodiment, the step in which the multiplicative inverse is converted back to the Galois field representation $GF(N^2)$ is merged with the step in which the affine transformation is performed. Specifically, in the present embodiment, the affine transform matrix M3 (AFF) is multiplied by the composite-to-original representation matrix M2 (C2P) to produce a fourth matrix M4. The matrix M4 is also a constant matrix. The matrix M4 can then be multiplied by the multiplicative inversion matrix M1 (C_inv) in GF(16) to obtain the output of the S-box (s_out) in GF(256). In essence, according to one embodiment of the present invention, the basis transformation (back to the original representation) and the affine transform are merged.

For a specified value pair for A and B, the matrix M4 can be precomputed. Accordingly, hardware implementing an S-box according to the present embodiment of the present invention can be advantageously designed to accomplish the inversion and affine transformation based on the established values of A and B and the known (constant) value of M4.

If, instead, the value pair A and B is programmable, the matrix M4 can be stored and used in subsequent passes through the S-box after it is computed the first time, thereby eliminating a matrix multiplication in the subsequent passes through the S-box. Alternatively, with a particular A and B specified in advance, the matrix M4 can be precomputed and stored, eliminating a matrix multiplication in entirety. In any case, according to embodiments of the present invention, propagation delay and silicon area in the S-box are further reduced by eliminating a matrix multiplication from each pass through the S-box.

Figure 6:
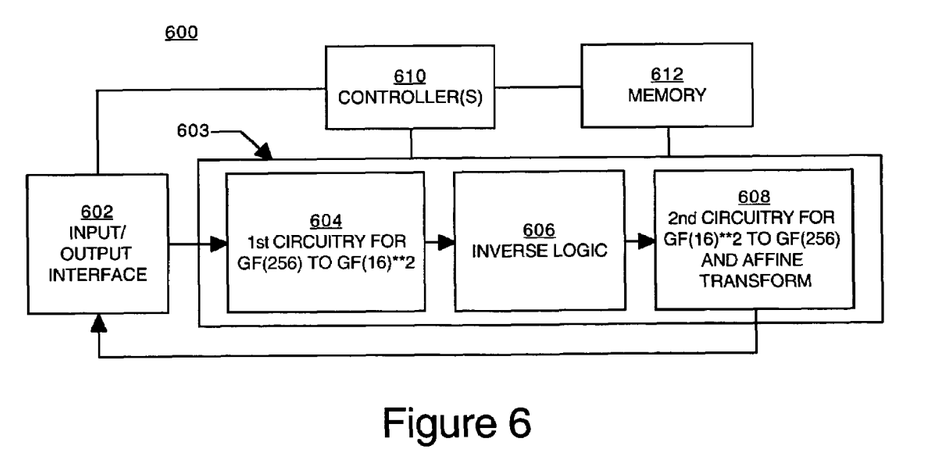
FIG. 6 is a block diagram of a circuit for implementing an S-box according to one embodiment of the present invention.

FIG. 6 is a block diagram of a circuit 600 for implementing an S-box 603 in hardware according to one embodiment of the present invention. In the embodiment of FIG. 6, circuit 600 includes one or more controllers 610, a memory 612, and an input/output (I/O) interface 602. In the present embodiment, S-box 603 includes first circuitry 604 for converting an input from an original representation to a composite representation, logic 606, and second circuitry 608. Circuit 600 can be implemented on a single chip, perhaps as an application-specific integrated circuit (ASIC) or field-programmable gate array (FPGA) or the like.

The I/O interface 602 is for receiving input data and for transmitting output data to a computer system, for receiving signals from the computer system, and for communicating with the computer system. The controller(s) 610 generate control signals that are used, for example, for handling data and for controlling and handling encryption and decryption processes such as those described above. Memory 612 is for storing the LUT used for inversion. Depending on how values of A and B are selected and implemented, memory 612 can also be used to store information such as selected values of A and B and values computed for the matrix M4 (refer to the discussion of FIG. 5, above).

The circuitry 604 of FIG. 6 is for converting an input to S-box 603 from its original representation (e.g., GF(256)) to its composite representation (e.g., $GF(16)^2$). Significantly, circuitry 604 uses a generating polynomial of the form $x^2+Ax+B$. In one embodiment, to reduce gate count, A has a value of (0010) and B has a value of (0010).

Logic 606 is for performing the lookup in the LUT used during the multiplicative inversion (e.g., in block 120 of FIG. 1). Circuitry 608 is for converting the multiplicative inverse from the composite representation back to the original representation and for the affine transform. In one embodiment, the transformation back to the original representation and the affine transform are merged, as described above in conjunction with FIG. 5.

In summary, embodiments of the invention provide methods and systems for implementing an S-box that can reduce gate count and silicon area overhead while maintaining high throughput and low latency. Although described primarily for encryption, features of the present invention can be readily extended to decryption. Also, the present invention may be used in applications other than cryptographic applications that use S-boxes. Within cryptography, the present invention may be used in applications other than AES and in applications that are variants derived from AES that use S-boxes.

Embodiments of the present invention are thus described. While the present invention has been described in particular embodiments, it should be appreciated that the present invention should not be construed as limited by such embodiments, but rather construed according to the below claims.

What is claimed is:

1. A method of implementing a switch box (S-box) in a cryptographic application, said method comprising:
converting an input to said S-box from a Galois field representation $GF(N^2)$ to a Galois subfield representation $GF(N)^2$ according to a generating polynomial;
determining a multiplicative inverse of said Galois subfield representation;
converting said multiplicative inverse back to said Galois field representation; and
performing an affine transformation of said multiplicative inverse after said converting of said multiplicative inverse back to said Galois field representation, wherein a result of said affine transformation is output of said S-box.

2. The method of claim 1 wherein said generating polynomial is in the form of $x^2+Ax+B$, wherein A has a value other than unity, and wherein A has a value of (0010) and wherein B has a value of (0010).

3. The method of claim 2 wherein values for A and B are selected so that said Galois subfield representation is isomorphic to said Galois field representation.

4. The method of claim 1 wherein said cryptographic application is substantially compliant with the Advanced Encryption Standard (AES).

5. The method of claim 1 wherein N is 16 and said determining the multiplicative inverse of said Galois subfield representation is performed with a lookup table having 16 entries available for the multiplicative inverse.

6. The method of claim 1 wherein said multiplicative inverse is represented as a first matrix, wherein said converting said multiplicative inverse uses a second matrix and said affine transformation uses a third matrix, wherein said third matrix is multiplied by said second matrix to produce a fourth matrix that is multiplied by said first matrix.

7. The method of claim 1 further comprising:
performing an inverse affine transformation of a second input received at a reverse S-box;
converting said second input from a second Galois field representation $GF(N^2)$ to a second Galois subfield representation $GF(N)^2$, wherein said converting uses said generating polynomial;
determining the multiplicative inverse of said second Galois subfield representation; and
converting said multiplicative inverse back to said second Galois field representation.

8. A computer-usable medium having computer-readable program code embodied therein for causing a computer system to perform a cryptographic method, said cryptographic method comprising:
converting an input to a switch box (S-box) from a Galois field representation $GF(N^2)$ to a Galois subfield representation $GF(N)^2$ according to an irreducible generating polynomial;
determining a multiplicative inverse of said Galois subfield representation;
converting said multiplicative inverse back to said Galois field representation; and
performing an affine transformation of said multiplicative inverse after said converting of said multiplicative inverse back to said Galois field representation, wherein a result of said affine transformation is output of said S-box.

9. The computer-usable medium of claim 8 wherein said generating polynomial is in the form of $x^2+Ax+B$, wherein A has a value other than unity, and wherein A has a value of (0010) and wherein B has a value of (0010).

10. The computer-usable medium of claim 9 wherein values for A and B are selected so that said Galois subfield representation is isomorphic to said Galois field representation.

11. The computer-usable medium of claim 8 wherein said cryptographic method is substantially compliant with the Advanced Encryption Standard (AES).

12. The computer-usable medium of claim 8 wherein N is 16 and said determining the multiplicative inverse of said Galois subfield representation is performed with a lookup table having 16 entries available for the multiplicative inverse.

13. The computer-usable medium of claim 8 wherein said multiplicative inverse is represented as a first matrix, wherein said converting said multiplicative inverse uses a second matrix and said affine transformation uses a third matrix, wherein said third matrix is multiplied by said second matrix to produce a fourth matrix that is multiplied by said first matrix.

14. A system for a hardware implementation of a switch box (S-box) in a cryptographic application, said system comprising:
means for converting an input to said S-box from a Galois field representation $GF(N^2)$ to a Galois subfield representation $GF(N)^2$ according to a generating polynomial;
means for determining a multiplicative inverse of said Galois subfield representation;
means for converting said multiplicative inverse back to said Galois field representation; and
means for performing an affine transformation of said multiplicative inverse after said means for converting converts said multiplicative inverse back to said Galois field representation $GF(N^2)$, where a result of said affine transformation is output of said S-box.

15. The system of claim 14 wherein said generating polynomial is in the form of $x^2+Ax+B$, wherein A has a value other than unity, and wherein A has a value of (0010) and wherein B has a value of (0010).

16. The system of claim 15 wherein values for A and B are selected so that said Galois subfield representation is isomorphic to said Galois field representation.

17. The system of claim 14 wherein said cryptographic application is substantially compliant with the Advanced Encryption Standard (AES).

18. The system of claim 14 wherein N is 16 and said means for determining the multiplicative inverse of said Galois subfield representation is performed with a lookup table having 16 entries available for the multiplicative inverse.

19. The system of claim 14 wherein said multiplicative inverse is represented as a first matrix, wherein said means for converting said multiplicative inverse uses a second matrix and said means for performing said affine transformation uses a third matrix, wherein said third matrix is multiplied by said second matrix to produce a fourth matrix that is multiplied by said first matrix.

20. The system of claim 14 further comprising:
   means for performing an inverse affine transformation of a second input received at a reverse S-box;
   means for converting said second input from a second Galois field representation $GF(N^2)$ to a second Galois subfield representation $GF(N)^2$, wherein said means for converting said second input uses said generating polynomial;
   means for determining the multiplicative inverse of said second Galois subfield representation; and
   means for converting said multiplicative inverse of said second Galois subfield representation back to said second Galois field representation.

21. A system for implementing a switch box (S-box) in a cryptographic application, said system comprising:
   circuitry for converting an input to said S-box from a Galois field representation $GF(N^2)$ to a Galois subfield representation $GF(N)^2$ according to a generating polynomial; and
   circuitry for converting a multiplicative inverse of said Galois subfield representation back to said Galois field representation and for performing an affine transformation of said multiplicative inverse after said converting of said multiplicative inverse back to said Galois field representation, wherein said multiplicative inverse is determined using a lookup table.

22. The system of claim 21 wherein said generating polynomial is in the form of $x^2+Ax+B$, wherein A has a value other than unity, and wherein A has a value of (0010) and wherein B has a value of (0010).

23. The system of claim 22 wherein values for A and B are selected so that said Galois subfield representation is isomorphic to said Galois field representation.

24. The system of claim 21 wherein said cryptographic application is substantially compliant with the Advanced Encryption Standard (AES).

25. The system of claim 21 wherein N is 16 and said lookup table has 16 entries available for the multiplicative inverse.

26. The system of claim 21 wherein said multiplicative inverse is represented as a first matrix, wherein said converting of said multiplicative inverse uses a second matrix and said affine transformation uses a third matrix, wherein said third matrix is multiplied by said second matrix to produce a fourth matrix that is multiplied by said first matrix.

\* \* \* \* \*

UNITED STATES PATENT AND TRADEMARK OFFICE
CERTIFICATE OF CORRECTION

PATENT NO. : 7,532,721 B2
APPLICATION NO. : 10/976533
DATED : May 12, 2009
INVENTOR(S) : Ming Zhang

It is certified that error appears in the above-identified patent and that said Letters Patent is hereby corrected as shown below:

At column 8, line 54, please delete "where" and insert -- wherein --.

At column 10, line 9, please delete the extra space " " after "Ax".

Signed and Sealed this

Twenty-second Day of December, 2009

David J. Kappos
*Director of the United States Patent and Trademark Office*